(12) United States Patent
Witte et al.

(10) Patent No.: US 12,280,627 B2
(45) Date of Patent: Apr. 22, 2025

(54) DAMPING ARRANGEMENT FOR AN AXLE OF A MOTOR VEHICLE

(71) Applicant: Dr. Ing. h.c. F. Porsche Aktiengesellschaft, Stuttgart (DE)

(72) Inventors: Thomas Witte, Ditzingen-Heimerdingen (DE); Andreas Freuer, Ludwigsburg (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 0 days.

(21) Appl. No.: 18/429,614

(22) Filed: Feb. 1, 2024

(65) Prior Publication Data
US 2024/0336103 A1 Oct. 10, 2024

(30) Foreign Application Priority Data
Apr. 4, 2023 (DE) .................. 10 2023 108 631.6

(51) Int. Cl.
*B60G 17/0195* (2006.01)
*B60G 17/08* (2006.01)

(52) U.S. Cl.
CPC ......... *B60G 17/0195* (2013.01); *B60G 17/08* (2013.01); *B60G 2202/24* (2013.01); *B60G 2204/40* (2013.01)

(58) Field of Classification Search
CPC .... B60G 17/08; B60G 13/08; B60G 2202/24; B60G 2202/416; B60G 2500/02; B60G 2500/10; B60G 2500/30; B60G 2800/162
(Continued)

(56) References Cited

U.S. PATENT DOCUMENTS 4,973,855 A * 11/1990 Kamimura ......... B60G 17/0185
280/124.159
7,611,152 B2 * 11/2009 van der Knaap .... B60G 17/056
280/124.16
(Continued)

FOREIGN PATENT DOCUMENTS

DE 102019118384 A1 1/2021
DE 102020114509 B3 5/2021
(Continued)

*Primary Examiner* — Paul N Dickson
*Assistant Examiner* — Caitlin Anne Miller
(74) *Attorney, Agent, or Firm* — Buchanan Ingersoll & Rooney PC

(57) ABSTRACT

Damping arrangement of an active chassis for an axle of a vehicle. A damping system cooperates with each wheel. Each of the damping systems has a damper having a double-acting hydraulic cylinder and a piston, a reversible hydraulic pump and an electric motor, and a hydraulic unit having a hydraulic reservoir and valves. The hydraulic pump and the hydraulic unit of the respective damping system cooperate with the hydraulic cylinder thereof such that, dependent upon the conveying direction of the hydraulic pump, a movement of the piston in a first actuation direction or in a second actuation direction can be provided. The electric motors of both damping systems are connected to and drivable by a common control device. A position sensor is associated with each electric motor to acquire the rotor position of the respective electric motor. A pressure sensor is associated with each hydraulic pump to acquire a pressure.

20 Claims, 2 Drawing Sheets

(58) Field of Classification Search
USPC .............. 280/124.157–159, 124.16–161
See application file for complete search history.

(56) References Cited

U.S. PATENT DOCUMENTS

| | | | |
|---|---|---|---|
| 9,676,244 B2* | 6/2017 | Giovanardi | ......... F15B 13/0444 |
| 9,702,349 B2* | 7/2017 | Anderson | ............ B60G 17/052 |
| 11,117,435 B2* | 9/2021 | Liebold | ................. B60G 13/08 |
| 2020/0114721 A1* | 4/2020 | Tanzan | ............... B60G 17/0157 |

FOREIGN PATENT DOCUMENTS

| DE | 102017117658 B4 | 6/2021 |
|---|---|---|
| DE | 102019115492 B4 | 8/2022 |
| EP | 2968709 B1 | 10/2019 |

\* cited by examiner

DAMPING ARRANGEMENT FOR AN AXLE OF A MOTOR VEHICLE

CROSS-REFERENCE TO RELATED APPLICATION

This application claims priority to German Patent Application No. 10 2023 108 631.6, filed Apr. 4, 2023, the content of such application being incorporated by reference herein in its entirety.

FIELD OF THE INVENTION

The invention relates to a damping arrangement of an active chassis of a motor vehicle for an axle of the motor vehicle, and to a motor vehicle.

BACKGROUND OF THE INVENTION

DE 10 2017 117 658 B4 and DE 10 2019 115 492 B4, which are each incorporated by reference herein, each disclose a damping system for a wheel of a motor vehicle, having a damper, a hydraulic pump driven by an electric motor, a hydraulic reservoir, and multiple valves. The damper is formed from a double-acting hydraulic cylinder and a piston movable in a reciprocating manner within said cylinder. The hydraulic pump is coupled to hydraulic chambers of the hydraulic piston via hydraulic lines, wherein a movement of the piston in a first actuation direction or in a second actuation direction can be provided depending on the conveying direction of the hydraulic pump.

A damping arrangement of an axle of an active chassis has two damping systems, wherein one damping system cooperates with each wheel of the axle. Each damping system typically has a separate control device via which the respective electric motor can be driven.

DE 10 2019 118 384 A1, which is incorporated by reference herein, discloses an apparatus for providing hydraulic energy in a chassis system, comprising a first hydraulic pump, a first electric motor for driving said first hydraulic pump, a second hydraulic pump, a second electric motor for driving said second hydraulic pump and a common electronics unit. This common electronics unit is configured to drive the first and second electric motors and thus to operate the two hydraulic pumps.

EP 2 968 709 B1 and DE 10 2020 114 509 B3, which are incorporated by reference herein, disclose further damping systems of active chassis of a motor vehicle.

Damping arrangements of active chassis are subjected to highly dynamic loads in operation. In order to ensure a high level of ride comfort, a damping arrangement of an active chassis must be very precisely controllable and/or regulable under highly dynamic loads.

SUMMARY OF THE INVENTION

Described herein is a damping arrangement for an axle of an active chassis of a motor vehicle, which can be controlled and/or regulated highly precisely even under highly dynamic loads. It is further intended to provide a motor vehicle having such a damping arrangement.

In the damping arrangement according to aspects of the invention, the electric motors of both damping systems are connected to a common control device and can be driven by the common control device.

In the damping arrangement according to aspects of the invention, a position sensor is respectively associated with each electric motor to detect the rotor position of the respective electric motor, and is connected to the common control device.

In the damping arrangement according to aspects of the invention, at least one pressure sensor for acquiring a pressure is also associated with each hydraulic pump and is connected to the common control device.

According to aspects of the invention, a common control device cooperates with the electric motors of both damping systems of the damping arrangement of an active chassis. Both electric motors are connected to and drivable by the common control device.

At least one position sensor cooperates with each electric motor to acquire the rotor position of the respective electric motor. At least one pressure sensor cooperates with each hydraulic pump to acquire a respective pressure.

Dependent upon the measurement signal of the respective position sensor and the respective pressure sensor, the control device drives the electric motors of both damping systems.

A highly precise regulation and/or control of the damping systems of the damping arrangement under highly dynamic loads are possible.

Preferably, the position sensors provide their respective measuring signals to the common control device, which drives the respective electric motor dependent thereon. The control device is, in particular, configured to determine a direction of rotation and/or a speed of rotation and/or a gradient over time of the speed of rotation of the respective electric motor from the measuring signals of the position sensors. Dependent upon the direction of rotation and/or the speed of rotation and/or the gradient over time of the speed of rotation of the electric motors, the electric motors and thus the hydraulic pumps can be driven highly dynamically and highly accurately by the control device. A high level of ride comfort can be ensured even under highly dynamic loading of the damping arrangement.

Preferably, two pressure sensors are associated with each hydraulic pump to acquire a respective pressure, namely a first pressure sensor for sensing a pressure downstream of the respective hydraulic pump when viewed in the conveying direction and/or and a second pressure sensor for acquiring a pressure upstream of the respective hydraulic pump when viewed in the conveying direction. This serves to further increase the accuracy of the regulation and/or control of the damping systems of the damping arrangement.

Preferably, the common control device comprises a developer interface with access to the electric motors and/or position sensors and/or pressure sensors. Via the developer interface, the damping arrangement can be easily customized to a specific type of vehicle.

BRIEF DESCRIPTION OF THE DRAWING FIGURES

Preferred further developments of the invention are disclosed in the claims and the description that follows. Embodiment examples of the invention will be explained in greater detail with reference to the drawings, but without being restricted thereto. In the drawings:

DETAILED DESCRIPTION OF THE INVENTION

Figure 1:
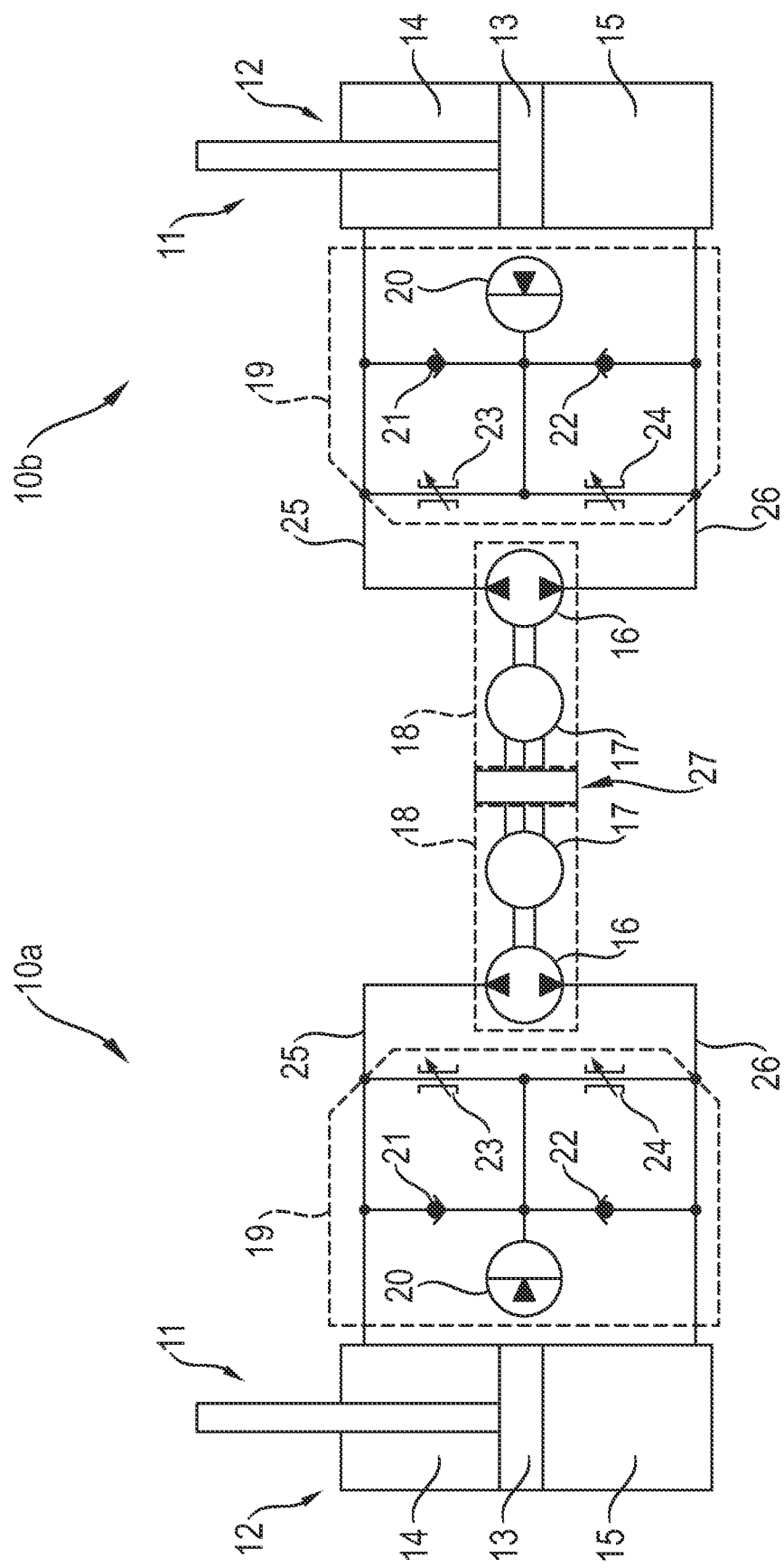
FIG. 1 shows a schematic representation of a damping arrangement according to aspects of the invention for the wheels of an axle of a motor vehicle according to aspects of the invention.

FIG. 1 shows, highly schematically, a damping arrangement according to aspects of the invention for two wheels of an axle of an active chassis of a motor vehicle. The damping arrangement of the active chassis has a damping system 10a, 10b for each wheel.

Each of the damping systems 10a, 10b comprises a damper 11 which is couplable to a wheel suspension system (not shown) for the respective wheel (not shown). Each damper 11 is formed by a double-acting hydraulic cylinder 12 and a piston 13, wherein the piston 13 is movable back and forth in the hydraulic cylinder 12 (up and down in FIG. 1). The hydraulic cylinder 12 designed as a double-acting hydraulic cylinder of each of the damping systems 10a, 10b comprises a hydraulic chamber 14, 15 on each side of the piston 13.

Dependent upon which of the two hydraulic chambers 14, 15 is being supplied with hydraulic oil and from which of the two hydraulic chambers 15, 14 hydraulic oil is being discharged, the piston 13 can be displaced in either a first actuation direction or in an opposing second actuation direction. The first actuation direction of the piston 13 involves an actuation in the pulling direction and the second actuation direction of the piston 13 is an actuation in the pushing direction.

Each damping system 10a, 10b further comprises a hydraulic pump 16 that is drivable by a respective electric motor 17. The hydraulic pump 16 and the electric motor 17 form a pump-motor unit 18. The hydraulic pump 16 is a reversible pump that can be driven by the respective electric motor 17 in different directions of rotation in order to provide different conveying directions.

Each damping system 10a, 10b of FIG. 1 further comprises a hydraulic unit 19 having a hydraulic reservoir 20 as well as valves 21, 22, 23, 24. The valves 21, 22 are check valves, and the valves 23, 24 are damping valves. The hydraulic reservoir 20 of each of the damping systems 10a, 10b engages in each case between the check valves 21, 22 and between the damping valves 23, 24 on hydraulic lines of the hydraulic unit 19 which are coupled to the hydraulic chambers 14, 15.

Dependent upon the conveying direction of the hydraulic pump 16 and preferably also dependent upon the position of the valves 21, 22, 23, 24 of each damping system, in order to displace the piston 13 in the first movement direction, that is the pulling direction, oil is supplied to the hydraulic chamber 14 and oil is removed from the hydraulic chamber 15, or, in order to provide a second movement direction of the piston 13 in the second movement direction, that is the pushing direction, oil is supplied to the hydraulic chamber 15 and oil is removed from the hydraulic chamber 14.

The hydraulic pump 16 of the pump-motor unit 18 of the respective damping system 10a, 10b is connected to the hydraulic unit 19, comprising the hydraulic reservoir 20 and the valves 21, 22, 23, 24, of the respective damping system 10a, 10b which unit is preferably installed as a unit on the damper 12 and/or on the hydraulic cylinder 13, via hydraulic lines 25, 26.

A common control device 27 cooperates with the pump-motor units 18 of the two damping systems 10a, 10b of the damping arrangement of the axle of the active chassis. According to FIG. 1, the electric motors 17 of the two pump motor units 18 are drivable by the common control device 17. This will now be considered in more detail making reference to FIG. 2.

Figure 2:
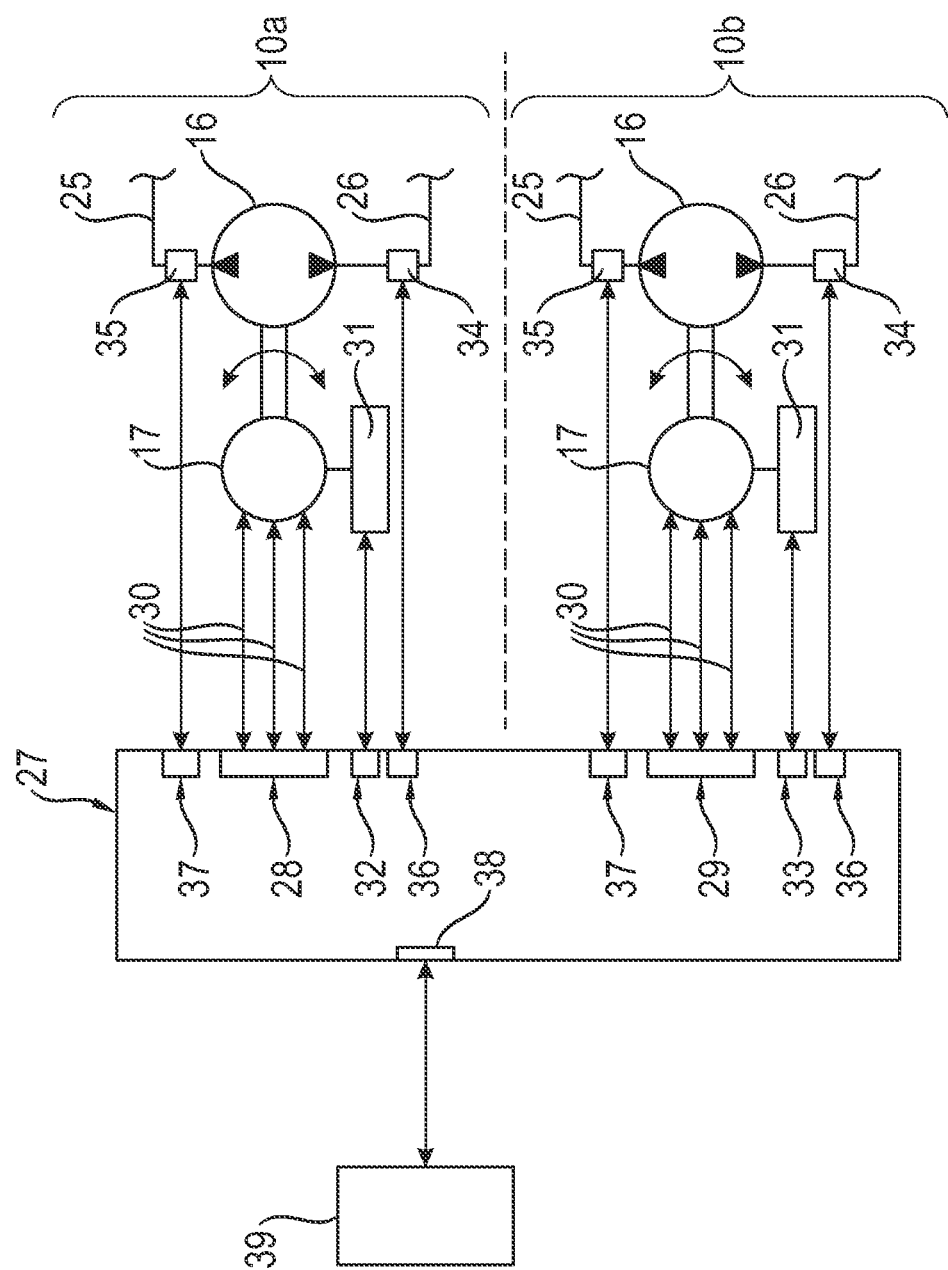
FIG. 2 shows a block diagram of control-side assemblies of the damping arrangement according to aspects of the invention of FIG. 1.

According to FIG. 2, the electric motor 17 of each of the damping systems 10a, 10b is connected to the control device 27 via a respective interface 28, 29 of the control device 27, wherein in FIG. 2, the respective phase lines 30 are connected between the respective electric motor 17 and the respective interface 28, 29 for driving and/or current supply and/or voltage supply to the respective electric motor 17.

A position sensor 31 is associated with each electric motor 17. The respective position sensor 31 is connected to the common control device 27 via a respective data interface 32, 33 of the common control device 27. The respective position sensor 31 serves to acquire the rotor position and/or armature position of the respective electric motor 17 and provides its measurement signal via the respective data interface 32, 33 of the common control device 27.

Furthermore, at least one pressure sensor 34, 35 is associated with each hydraulic pump 16 and thus each damping system 10a, 10b. This serves to detect the pressure in the respective hydraulic line 25, 26.

According to FIG. 2, a first pressure sensor 34 and a second pressure sensor 35 is associated with each hydraulic pump 16, wherein the first pressure sensor 34 is disposed in the hydraulic line 26 and the second pressure sensor 35 is disposed in the hydraulic line 25 and/or measures the pressure in the respective hydraulic line. Dependent upon the direction of rotation of the respective electric motor 17 and thus the conveying direction of the respective hydraulic pump 16, one of the pressure sensors measures the pressure downstream of the respective hydraulic pump 16 and the other pressure sensor measures the pressure upstream of the respective hydraulic pump 16.

Each of the pressure sensors 34, 35 is connected to the common control device 27 via a respective data interface 36 or 37, wherein the respective pressure sensor 34, 35 provides its respective measurement signal via the respective data interface 36 or 37 of the common control device 27.

The control device 27 is configured to drive the electric motors 17 of the damping systems 10a, 10b, specifically to control and/or regulate them, dependent upon the measurement signals of the position sensors 31 and dependent upon the measurement signals of the pressure sensors 34, 35. The control device may comprise a computer having a processor, controller, memory, software, etc.

The control device 37 is, in particular, configured to determine a direction of rotation and/or speed of rotation and/or a gradient over time of the speed of rotation of the respective electric motor 17 dependent upon the measurement signals of the position sensors 31 and to drive the two electric motors 17 of the two damping systems 10a, 10b, dependent thereon.

Based on these signals, the common control device 27 can provide an optimal damping behavior even under highly dynamic loads, specifically via a highly accurate and high-frequency regulation of the electric motors 17 and thus ultimately the hydraulic pumps 16 of the damping systems 10a, 10b.

In the preferred embodiment example shown, the common control device 27 further has a developer interface 38 via which an external computer 39 and/or a development computer can be connected to the common control device 27. The developer interface 38 enables access to the electric motors 17 and/or position sensors 31 and/or pressure sensors 34, 35 of the damping systems 10a, 10b. In this way, it is possible for the developer to adapt the damping arrangement to a specific configuration of a vehicle.

The damping arrangement described with reference to FIGS. 1, 2 is associated with an axle of an active chassis of a motor vehicle. If the motor vehicle has multiple axles, such a damping arrangement is preferably associated with each axle.

What is claimed:

1. A damping arrangement of an active chassis for an axle of a motor vehicle, said damping arrangement comprising:
    (a) damping systems that cooperate with respective wheels of the axle, wherein each damping system comprises:
        (i) a damper having a double-acting hydraulic cylinder and a piston, wherein the damper is configured to be coupled to a wheel suspension system of the respective wheel,
        (ii) a hydraulic pump and an electric motor for driving the respective hydraulic pump, wherein the hydraulic pump is a reversible pump which is configured to be driven by the electric motor in different directions of rotation to provide different conveying directions, and
        (iii) a hydraulic unit having a hydraulic reservoir and valves, wherein the hydraulic pump and the hydraulic unit of the respective damping system cooperate with hydraulic chambers of the hydraulic cylinder of the respective damping system in such a way that, dependent upon the conveying direction of the hydraulic pump of the hydraulic unit, the piston can be moved in either a first actuating direction or in a second actuating direction,
    (b) a common control device to which the electric motors of both the damping systems are connected, wherein the common control device is configured to control operation of the electric motors,
    (c) a position sensor associated with each electric motor for detecting a rotor position of the respective electric motor, the position sensor being connected to the common control device, and
    (d) at least one pressure sensor associated with each hydraulic pump for acquiring a pressure, the at least one pressure sensor being connected to the common control device,
    wherein the common control device comprises a developer interface having access to the electric motors and/or the position sensor and/or the pressure sensor.

2. The damping arrangement according to claim 1, wherein two pressure sensors are each associated with each hydraulic pump to acquire a respective pressure, the two pressure sensors comprising:
    a first pressure sensor for acquiring a pressure downstream of the respective hydraulic pump, when viewed in the conveying direction of the respective hydraulic pump, and
    a second pressure sensor for acquiring a pressure upstream of the respective hydraulic pump, when viewed in the conveying direction of the respective hydraulic pump.

3. The damping arrangement according to claim 1, wherein the pressure sensors provide respective measuring signals to the common control device which drives the respective electric motor as a function of the measuring signals.

4. The damping arrangement according to claim 1, wherein the position sensors provide respective measuring signals to the common control device which drives the respective electric motor as a function of the measuring signals.

5. The damping arrangement according to claim 4, wherein the common control device is configured to (i) determine a direction of rotation of the respective electric motor from the measuring signals of the position sensors and (ii) drive the respective electric motor as a function of the determined direction of rotation.

6. The damping arrangement according to claim 4, wherein the common control device is configured to (i) determine from the measuring signals of the position sensors a speed of rotation of the respective electric motor and (ii) drive the respective electric motor as a function of the determined speed of rotation.

7. The damping arrangement according to claim 4, wherein the common control device is configured to (i) determine from the measuring signals of the position sensors a gradient over time of the speed of rotation of the respective electric motor and (ii) drive the respective electric motor as a function of the determined gradient over time of the speed of rotation.

8. A motor vehicle having multiple axles, wherein the damping arrangement according to claim 1 is associated with each axle.

9. The damping arrangement according to claim 1, wherein the developer interface has access to the electric motors, the position sensor and the pressure sensor.

10. The damping arrangement according to claim 1, wherein a first side of the hydraulic pump is fluidly connected to a first chamber of said hydraulic chambers of the hydraulic cylinder via a first hydraulic line and a second side of the hydraulic pump is fluidly connected to a second chamber of said hydraulic chambers of the hydraulic cylinder via a second hydraulic line, wherein the first and second chambers of the hydraulic cylinder are delimited by the piston that is disposed within the hydraulic cylinder.

11. The damping arrangement according to claim 10, wherein a third hydraulic line fluidly interconnects the first and second hydraulic lines, and wherein at least one of said valves is a first damping valve that is directly and fluidly connected to the third hydraulic line.

12. The damping arrangement according to claim 11, wherein a fourth hydraulic line interconnects the first and second hydraulic lines, and wherein the third and fourth hydraulic lines are fluidly interconnected together by a fifth hydraulic line.

13. The damping arrangement according to claim 12, wherein at least one of said valves is a first check valve that is directly and fluidly connected to the fourth hydraulic line.

14. The damping arrangement according to claim 13, wherein a second check valve is directly and fluidly connected to the fourth hydraulic line, and wherein said first and second check valves are disposed on opposite sides of an intersection point connecting the fourth and fifth hydraulic lines.

15. The damping arrangement according to claim 12, wherein the hydraulic reservoir is directly and fluidly connected to the fifth hydraulic line.

16. The damping arrangement according to claim 11, wherein a second damping valve is directly and fluidly connected to the third hydraulic line, and said first damping valve and said second damping valve are disposed on opposite sides of an intersection point connecting the third and fifth hydraulic lines.

17. The damping arrangement according to claim 1, wherein the developer interface is a port disposed on the common control device via which an external computer can be connected.

18. The damping arrangement according to claim 1, wherein the at least one pressure sensor is directly connected to the common control device via a first signal line, and the position sensor is directly connected to the common control device via a second signal line.

19. The damping arrangement according to claim 18, wherein the electric motor is directly connected to the common control device via phase lines.

20. The damping arrangement according to claim 1, wherein the common control device is a singular unit.

* * * * *